US012418346B2

(12) United States Patent
Zhang et al.

(10) Patent No.: US 12,418,346 B2
(45) Date of Patent: Sep. 16, 2025

(54) SIGNAL RECEIVING APPARATUS AND METHOD

(71) Applicant: HUAWEI TECHNOLOGIES CO., LTD., Shenzhen (CN)

(72) Inventors: Weiwei Zhang, Shenzhen (CN); Xu Li, Shenzhen (CN); Tianxiang Wang, Shenzhen (CN); Yibo Lv, Dongguan (CN); Dongyu Geng, Shenzhen (CN); Bofang Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 18/307,641

(22) Filed: Apr. 26, 2023

(65) Prior Publication Data

US 2023/0261758 A1    Aug. 17, 2023

Related U.S. Application Data

(63) Continuation of application No. PCT/CN2021/124874, filed on Oct. 20, 2021.

(30) Foreign Application Priority Data

Oct. 27, 2020   (CN) .......................... 202011175626.8

(51) Int. Cl.
*H04B 10/00*   (2013.01)
*H04B 10/60*   (2013.01)
(Continued)

(52) U.S. Cl.
CPC .............. *H04B 10/60* (2013.01); *H04J 14/06* (2013.01)

(58) Field of Classification Search
CPC .......... H04B 10/2575; H04B 10/25752; H04B 10/25753; H04B 10/25758; H04B 10/614; H04B 10/63
See application file for complete search history.

(56) References Cited

FOREIGN PATENT DOCUMENTS

| CN | 107171732 A |   | 9/2017 |
| CN | 110031832 A | * | 7/2019 |

OTHER PUBLICATIONS

Machine Translation of CN-110031832-A (Year: 2019).*
(Continued)

*Primary Examiner* — Daniel G Dobson
(74) *Attorney, Agent, or Firm* — Leydig, Voit & Mayer, Ltd.

(57) ABSTRACT

A signal receiving apparatus and method are provided. When a baseband signal is restored, an orthogonal polarization state of light does not need to be precisely controlled. This is easy to implement and can reduce system costs. The apparatus includes an optical splitter configured to split a first polarization multiplexing optical signal into at least two second polarization multiplexing optical signals, and input the two second polarization multiplexing optical signals into at least two optical signal processing modules. An optical signal processing module is configured to couple the second polarization multiplexing optical signal, and input a coupled optical signal to a photoelectric detector configured to convert the coupled optical signal into an analog signal. An analog-to-digital converter is configured to convert the analog signal into a digital signal, and input the digital signal to a digital signal processor configured to process the digital signal to obtain a baseband signal.

15 Claims, 6 Drawing Sheets

(51) Int. Cl.
    *H04J 14/06*        (2006.01)
    *H04J 14/00*        (2006.01)

(56) References Cited

OTHER PUBLICATIONS

Gao et al., "Simultaneously photonic frequency downconversion, multichannel phase shifting, and IQ demodulation for wideband microwave signals," vol. 41, No. 19, Optics Letters, pp. 4484-4487 (Oct. 1, 2016).

Gao et al., "Ultra-Wideband Photonic Microwave I/Q Mixer for Zero-IF Receiver," IEEE Transactions on Microwave Theory and Techniques, vol. 65, No. 11, pp. 1-13, IEEE—Institute of Electrical and Electronics Engineers, New York, New York (Nov. 2017).

\* cited by examiner

SIGNAL RECEIVING APPARATUS AND METHOD

CROSS-REFERENCE TO RELATED APPLICATIONS

This application is a continuation of International Application No. PCT/CN2021/124874, filed on Oct. 20, 2021, which claims priority to Chinese Patent Application No. 202011175626.8, filed on Oct. 27, 2020. The disclosures of the aforementioned applications are hereby incorporated by reference in their entireties.

TECHNICAL FIELD

The present disclosure relates to the communication field, and more specifically, to a signal receiving apparatus and method.

BACKGROUND

With the rapid development of communication technologies, people have higher requirements on transmission of a large amount of data in scenarios such as a high-definition video, virtual reality, and a remote conference. The transmission requirements include an ultra-high rate, a low delay, an ultra-large network capacity, and the like. This imposes higher requirements on a current communication system. Microwave and millimeter-wave technologies have become key technologies of current wireless communication systems. In microwave photonics technologies, light may be used to resolve problems in an electrical domain, and advantages of microwave and optical communication are combined. The microwave photonics technologies have advantages such as ultra-wideband, low loss, anti-electromagnetic interference, and low costs, and are increasingly widely studied.

In the field of microwave photonics technologies, a microwave photon zero-intermediate frequency receiver has low costs and a small size, and currently is a receiver with a high integration level. In the conventional technology, the microwave photon zero-intermediate frequency receiver restores an in-phase/quadrature (in-phase/quadrature, IQ) signal of a baseband signal by using a circuit simulation method. In this method, a quadrature polarization state and a phase difference of light need to be precisely controlled. This is difficult and costly to implement.

SUMMARY

The present disclosure provides a signal receiving apparatus and method. When a baseband signal is restored, an orthogonal polarization state of light does not need to be precisely controlled. This is easy to implement and can reduce system costs.

According to a first aspect, a signal receiving apparatus is provided. The receiving apparatus includes an optical splitter, an optical signal processing module, a photoelectric detector, an analog-to-digital converter, and a digital signal processor. The optical splitter is configured to: receive a first polarization multiplexing optical signal from a remote apparatus, split the first polarization multiplexing optical signal into at least two paths to obtain at least two second polarization multiplexing optical signals, and input the at least two second polarization multiplexing optical signals into at least two optical signal processing modules respectively, where the first polarization multiplexing optical signal is obtained by modulating a radio frequency signal and a local oscillator signal to two orthogonal polarization states of an optical carrier respectively. The optical signal processing module is configured to couple the second polarization multiplexing optical signal to obtain a linearly polarized optical signal, and input the linearly polarized optical signal to the photoelectric detector. The photoelectric detector is configured to convert the linearly polarized optical signal into an analog signal, and input the analog signal to the analog-to-digital converter. The analog-to-digital converter is configured to perform analog-to-digital conversion on the analog signal to obtain a digital signal, and input the digital signal to the digital signal processor. The digital signal processor is configured to process the digital signal to obtain a baseband signal.

According to the signal receiving apparatus in this embodiment, at least three mutually independent analog signals are output, analog-to-digital conversion is performed on the at least three analog signals, then the at least three analog signals are input to the digital signal processor for digital processing, and IQ signal is restored in a digital domain. Therefore, a circuit architecture does not need to precisely control an orthogonal polarization state of light. In this way, the circuit architecture can easily restore a baseband signal, and reduce system costs.

It should be understood that the remote apparatus may include an antenna, a bandpass filter, a low noise amplifier, a photoelectric modulator, a local oscillator, a laser, and an optical bandpass filter. The antenna is configured to receive a first radio frequency signal, and input the first radio frequency signal to the bandpass filter. The bandpass filter is configured to filter the first radio frequency signal to obtain a second radio frequency signal, and input the second radio frequency signal to the low noise amplifier. The low noise amplifier is configured to amplify the second radio frequency signal to obtain a third radio frequency signal, and input the third radio frequency signal to one radio frequency input end of the photoelectric modulator. The local oscillator is configured to generate a local oscillator signal having a same frequency as the third radio frequency signal, and input the local oscillator signal to another radio frequency input end of the photoelectric modulator. The laser is configured to generate a fifth linearly polarized optical signal, and input the linearly polarized optical signal to an optical input end of the photoelectric modulator. The photoelectric modulator is configured to split the linearly polarized optical signal into an upper signal and a lower signal, separately perform optical domain modulation on the third radio frequency signal and the local oscillator signal by using the linearly polarized optical signal, to obtain orthogonal polarization multiplexing light, and input the orthogonal polarization multiplexing light to the optical bandpass filter. The optical bandpass filter is configured to filter the orthogonal polarization multiplexing light, to obtain an upper sideband signal or a lower sideband signal of the orthogonal polarization multiplexing light, and determine the upper sideband signal or the lower sideband signal as the first polarization multiplexing optical signal.

With reference to the first aspect, in some implementations of the first aspect, the optical signal processing module includes a polarization beam splitter and a polarizer. The photoelectric detector includes a first photoelectric detector, a second photoelectric detector, and a third photoelectric detector. The analog-to-digital converter includes a first analog-to-digital converter, a second analog-to-digital converter, and a third analog-to-digital converter. The polarization beam splitter is configured to couple and output the second polarization multiplexing optical signal to two main axes of the polarization beam splitter, to obtain a first linearly polarized optical signal and a second linearly polarized optical signal, input the first linearly polarized optical signal to the first photoelectric detector, and input the second linearly polarized optical signal to the second photoelectric detector. The polarizer is configured to couple and output the second polarization multiplexing optical signal to a main axis of the polarizer, to obtain a third linearly polarized optical signal, and input the third linearly polarized optical signal to the third photoelectric detector. The first photoelectric detector is configured to convert the first linearly polarized optical signal into a first analog signal, and input the first analog signal to the first analog-to-digital converter. The second photoelectric detector is configured to convert the second linearly polarized optical signal into a second analog signal, and input the second analog signal to the second analog-to-digital converter. The third photoelectric detector is configured to convert the third linearly polarized optical signal into a third analog signal, and input the third analog signal to the third analog-to-digital converter. The first analog-to-digital converter is configured to perform analog-to-digital conversion on the first analog signal to obtain a first digital signal, and input the first digital signal to the digital signal processor. The second analog-to-digital converter is configured to perform analog-to-digital conversion on the second analog signal to obtain a second digital signal, and input the second digital signal to the digital signal processor. The third analog-to-digital converter is configured to perform analog-to-digital conversion on the third analog signal to obtain a third digital signal, and input the third digital signal to the digital signal processor. The digital signal processor is configured to process the first digital signal, the second digital signal, and the third digital signal to obtain the baseband signal.

According to this embodiment, three mutually independent analog signals are output, analog-to-digital conversion is performed on the three analog signals, then the three analog signals are input to the digital signal processor for digital processing, and IQ signal is restored in a digital domain. Therefore, the circuit architecture does not need to precisely control an orthogonal polarization state of light. In this way, the circuit architecture can easily restore a baseband signal, and reduce system costs.

With reference to the first aspect, in some implementations of the first aspect, at least one of a first polarization controller and a first optical fiber is disposed between the optical splitter and the polarization beam splitter, and the first polarization controller or the first optical fiber is configured to adjust a polarization state of the second polarization multiplexing optical signal; and/or at least one of a second polarization controller and a second optical fiber is disposed between the optical splitter and the polarizer, and the second polarization controller or the second optical fiber is configured to adjust a polarization state of the second polarization multiplexing optical signal.

It should be understood that a polarization state of an optical signal is adjusted to ensure that the three output analog signals are independent of each other.

With reference to the first aspect, in some implementations of the first aspect, the optical signal processing module includes a first polarization beam splitter and a second polarization beam splitter, the photoelectric detector includes a first photoelectric detector, a second photoelectric detector, a third photoelectric detector, and a fourth photoelectric detector, and the analog-to-digital converter includes a first analog-to-digital converter, a second analog-to-digital converter, a third analog-to-digital converter, and a fourth analog-to-digital converter. The first polarization beam splitter is configured to couple and output the second polarization multiplexing optical signal to two main axes of the first polarization beam splitter to obtain a first linearly polarized optical signal and a second linearly polarized optical signal, input the first linearly polarized optical signal to the first photoelectric detector, and input the second linearly polarized optical signal to the second photoelectric detector. The second polarization beam splitter is configured to couple and output the second polarization multiplexing optical signal to two main axes of the second polarization beam splitter to obtain a third linearly polarized optical signal and a fourth linearly polarized optical signal, input the third linearly polarized optical signal to the third photoelectric detector, and input the fourth linearly polarized optical signal to the fourth photoelectric detector. The first photoelectric detector is configured to convert the first linearly polarized optical signal into a first analog signal, and input the first analog signal to the first analog-to-digital converter. The second photoelectric detector is configured to convert the second linearly polarized optical signal into a second analog signal, and input the second analog signal to the second analog-to-digital converter. The third photoelectric detector is configured to convert the third linearly polarized optical signal into a third analog signal, and input the third analog signal to the third analog-to-digital converter. The fourth photoelectric detector is configured to convert the fourth linearly polarized optical signal into a fourth analog signal, and input the fourth analog signal to the fourth analog-to-digital converter. The first analog-to-digital converter is configured to perform analog-to-digital conversion on the first analog signal to obtain a first digital signal, and input the first digital signal to the digital signal processor. The second analog-to-digital converter is configured to perform analog-to-digital conversion on the second analog signal to obtain a second digital signal, and input the second digital signal to the digital signal processor. The third analog-to-digital converter is configured to perform analog-to-digital conversion on the third analog signal to obtain a third digital signal, and input the third digital signal to the digital signal processor. The fourth analog-to-digital converter is configured to perform analog-to-digital conversion on the fourth analog signal to obtain a fourth digital signal, and input the fourth digital signal to the digital signal processor. The digital signal processor is configured to process the first digital signal, the second digital signal, the third digital signal, and the fourth digital signal to obtain the baseband signal.

According to this embodiment, four mutually independent analog signals are output, analog-to-digital conversion is performed on the four analog signals, then the four analog signals are input to the digital signal processor for digital processing, and IQ signal is restored in a digital domain. Therefore, the circuit architecture does not need to precisely control an orthogonal polarization state of light. In this way, the circuit architecture can easily restore a baseband signal, and reduce system costs.

With reference to the first aspect, in some implementations of the first aspect, at least one of a first polarization controller and a first optical fiber is disposed between the optical splitter and the first polarization beam splitter, and the first polarization controller or the first optical fiber is configured to adjust a polarization state of the second polarization multiplexing optical signal; and/or at least one of a first polarization controller and a first optical fiber is disposed between the optical splitter and the second polarization beam splitter, and the first polarization controller or the first optical fiber is configured to adjust a polarization state of the second polarization multiplexing optical signal.

It should be understood that a polarization state of an optical signal is adjusted to ensure that the four output analog signals are independent of each other.

According to a second aspect, a signal receiving method is provided, including: receiving a first polarization multiplexing optical signal from a remote apparatus, splitting the first polarization multiplexing optical signal into at least two paths to obtain at least two second polarization multiplexing optical signals; coupling the second polarization multiplexing optical signal to obtain a linearly polarized optical signal; converting the linearly polarized optical signal into an analog signal, and performing analog-to-digital conversion on the analog signal to obtain a digital signal; and processing the digital signal to obtain a baseband signal. The method may be performed by any apparatus that may be implemented in the first aspect.

According to the signal receiving method in this embodiment, at least three mutually independent analog signals are obtained, the at least three analog signals are converted into digital signals for digital processing, and IQ signal is restored in a digital domain. Therefore, according to the signal receiving method, there is no need to precisely control an orthogonal polarization state of light, and baseband signal restoration is easily implemented.

With reference to the second aspect, in some implementations of the second aspect, the coupling the second polarization multiplexing optical signal to obtain a linearly polarized optical signal includes: coupling and outputting one of the at least two second polarization multiplexing optical signals to obtain a first linearly polarized optical signal and a second linearly polarized optical signal; and coupling and outputting another one of the at least two second polarization multiplexing optical signals to obtain a third linearly polarized optical signal.

The converting the linearly polarized optical signal into an analog signal, and performing analog-to-digital conversion on the analog signal to obtain a digital signal includes: converting the first linearly polarized optical signal into a first analog signal, and performing analog-to-digital conversion on the first analog signal to obtain a first digital signal; converting the second linearly polarized optical signal into a second analog signal, and performing analog-to-digital conversion on the second analog signal to obtain a second digital signal; and converting the third linearly polarized optical signal into a third analog signal, and performing analog-to-digital conversion on the third analog signal to obtain a third digital signal.

The processing the digital signal to obtain a baseband signal includes: processing the first digital signal, the second digital signal, and the third digital signal to obtain the baseband signal.

With reference to the second aspect, in some implementations of the second aspect, the coupling and outputting one of the at least two second polarization multiplexing optical signals to obtain a first linearly polarized optical signal and a second linearly polarized optical signal includes: adjusting a polarization state of the second polarization multiplexing optical signal to obtain an adjusted optical signal; and coupling and outputting the adjusted optical signal to obtain the first linearly polarized optical signal and the second linearly polarized optical signal.

With reference to the second aspect, in some implementations of the second aspect, the coupling and outputting another one of the at least two second polarization multiplexing optical signals to obtain a third linearly polarized optical signal includes: adjusting a polarization state of the another second polarization multiplexing optical signal to obtain another adjusted optical signal; and coupling and outputting the another adjusted optical signal to obtain the third linearly polarized optical signal.

With reference to the second aspect, in some implementations of the second aspect, the coupling the second polarization multiplexing optical signal to obtain a linearly polarized optical signal includes: coupling and outputting one of the at least two second polarization multiplexing optical signals to obtain a first linearly polarized optical signal and a second linearly polarized optical signal; and coupling and outputting another one of the at least two second polarization multiplexing optical signals to obtain a third linearly polarized optical signal and a fourth linearly polarized optical signal.

The converting the linearly polarized optical signal into an analog signal, and performing analog-to-digital conversion on the analog signal to obtain a digital signal includes: converting the first linearly polarized optical signal into a first analog signal, and performing analog-to-digital conversion on the first analog signal to obtain a first digital signal; converting the second linearly polarized optical signal into a second analog signal, and performing analog-to-digital conversion on the second analog signal to obtain a second digital signal; converting the third linearly polarized optical signal into a third analog signal, and performing analog-to-digital conversion on the third analog signal to obtain a third digital signal; and converting the fourth linearly polarized optical signal into a fourth analog signal, and performing analog-to-digital conversion on the fourth analog signal to obtain a fourth digital signal.

The processing the digital signal to obtain a baseband signal includes: processing the first digital signal, the second digital signal, the third digital signal, and the fourth digital signal to obtain the baseband signal.

With reference to the second aspect, in some implementations of the second aspect, the coupling and outputting one of the at least two second polarization multiplexing optical signals to obtain a first linearly polarized optical signal and a second linearly polarized optical signal includes: adjusting a polarization state of the second polarization multiplexing optical signal to obtain an adjusted optical signal; and coupling and outputting the adjusted optical signal to obtain the first linearly polarized optical signal and the second linearly polarized optical signal.

With reference to the second aspect, in some implementations of the second aspect, the coupling and outputting another one of the at least two second polarization multiplexing optical signals to obtain a third linearly polarized optical signal and a fourth linearly polarized optical signal includes: adjusting a polarization state of the another second polarization multiplexing optical signal to obtain another adjusted optical signal; and coupling and outputting the another adjusted optical signal to obtain the third linearly polarized optical signal and the fourth linearly polarized optical signal.

According to a third aspect, a signal receiving system is provided, including the signal receiving apparatus, the remote apparatus, and the optical fiber in any possible implementation of the first aspect.

According to a fourth aspect, a signal receiving apparatus is provided, configured to perform the method in any possible implementation of the second aspect. Specifically, the apparatus includes a module configured to perform the method according to any possible implementation of the second aspect.

According to a fifth aspect, a computer program product is provided. The computer program product includes a computer program (which may also be referred to as code or an instruction). When the computer program is run, a computer is enabled to perform the method according to any possible implementation of the second aspect.

According to a sixth aspect, a computer-readable storage medium is provided. The computer-readable storage medium stores a computer program (which may also be referred to as code or instructions). When the computer program is run on a computer, the computer is enabled to perform the method in any possible implementation of the second aspect.

According to a seventh aspect, a chip system is provided. The chip system includes a processor, configured to implement the method according to any one of the second aspect or the possible implementations of the second aspect. In a possible design, the chip system further includes a memory, and the memory is configured to store a program instruction. The chip system may include a chip, or may include a chip and another discrete component.

DESCRIPTION OF EMBODIMENTS

Figure 1:
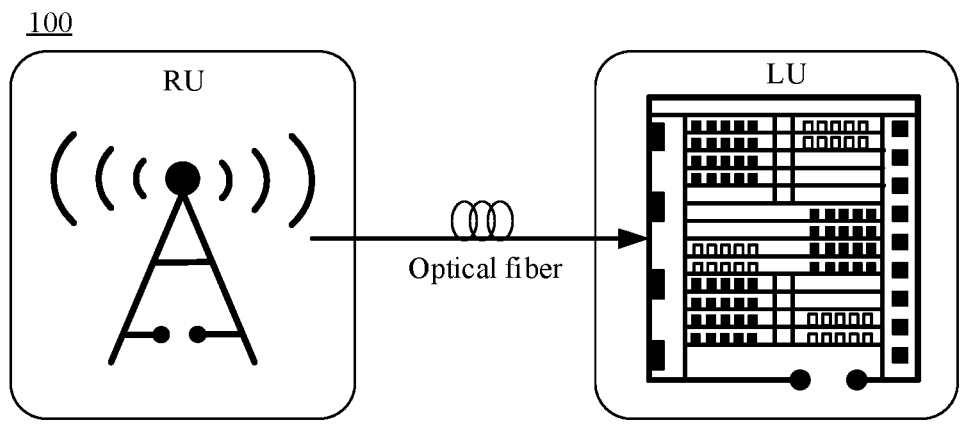
FIG. 1 is a schematic block diagram of a system architecture of a signal receiving apparatus according to an embodiment.

The following describes technical solutions with reference to the accompanying drawings.

The technical solutions in embodiments may be applied to various communication systems, for example, a long term evolution (LTE) system, an LTE frequency division duplex (FDD) system, an LTE time division duplex (TDD) system, a universal mobile telecommunications system (UMTS), a 5th generation (5G) system, new radio (NR), or another evolved communication system.

In addition, the technical solutions in embodiments may be further applied to various electronic receiving systems in the microwave field, for example, phased-array radar and satellite communication. This is not limited in embodiments of the present disclosure.

For ease of understanding, related terms in embodiments are described first.

1. A bandpass filter (BPF) is a device that allows a wave of a specific band to pass through and shields a wave of another band.

2. A low noise amplifier (LNA) is an amplifier with a low noise factor. The low noise amplifier is usually used as a high-frequency or intermediate-frequency preamplifier of various radio receivers, and is usually used as an amplification circuit of a high-sensitivity electronic detection device.

3. A photoelectric modulator is made of some electro-optic crystals, for example, a lithium niobate crystal (LiNbO3), a gallium arsenide crystal (GaAs), and a lithium tantalate crystal (LiTaO3) through electro-optic effects. The electro-optic effect means that when a voltage is applied to an electro-optic crystal, a refractive index of the electro-optic crystal changes, and an optical wave feature of the crystal changes. Therefore, modulation of a phase, an amplitude, intensity, and a polarization state of an optical signal is implemented.

In this application, the photoelectric modulator may be a polarization division multiplexing Mach-Zehnder modulator (PDM-MZM) and a polarization division multiplexing dual-electrode Mach-Zehnder modulator (PDM-DEMZM).

The PDM-MZM and the PDM-DEMZM may split input light into two equal signals to respectively enter two optical tributaries of the modulator. The two optical tributaries are made of electro-optic materials, and a refractive index of the optical tributary changes with a magnitude of an externally applied electrical signal. When output ends of the two optical tributaries of the modulator are combined again, a combined optical signal is an interference signal with varying intensity, which is equivalent to converting a change of an electrical signal into a change of the optical signal. This implements optical intensity modulation.

4. An optical bandpass filter (OBPF) is a device used to filter any one of an upper sideband or a lower sideband of an input optical signal.

5. A local oscillator (e.g., a voltage-controlled oscillator (VCO)) refers to an oscillation circuit whose output frequency corresponds to an input control voltage, or an oscillator whose frequency is a function of an input signal voltage. When a working status of an oscillator or a component parameter of an oscillation loop are controlled by an input control voltage, a voltage-controlled oscillator can be formed.

6. A radio frequency (RF) signal is a modulated radio wave that has a specific transmit frequency.

7. A local oscillator (LO) signal is generated by a local oscillator. A principle for selecting an oscillation frequency of the local oscillator signal is: selecting an oscillation frequency that can affect a working frequency of another radio station.

8. A 90-degree polarization rotator (90° PR) is a device used to change a polarization state of an input optical signal.

9. A polarization beam combiner (PBC) is used to couple two beams of orthogonal polarization light into one light, and can be used for power combining of a pump laser, to improve an extinction ratio of an optical fiber laser.

10. An optical splitter (OS) is also referred to as a splitter, is one of important passive components in an optical fiber link, and is an optical fiber convergence component with a plurality of input ends and a plurality of output ends.

11. A polarization beam splitter (PBS) is used to couple a single output of a beam of orthogonal polarization light to two optical fiber outputs.

12. A polarization controller (PC) is a component used to change a polarization angle of input light.

13. A polarizer (POL) is a component that obtains polarized light from natural light emitted by a common light source.

14. A photoelectric detector (PD) is used to convert an optical signal into an electrical signal. The principle is that a conductivity of an irradiated material changes due to radiation.
15. An analog-to-digital converter (ADC) is an electronic component that converts an analog signal into a digital signal.
16. A digital signal processor (DSP) is a processor that is composed of a large-scale integrated circuit chip or an ultra-large scale integrated circuit chip and is used to process a digital signal.

Before a signal receiving apparatus and a signal receiving method provided in embodiments are described, the following descriptions are first provided.

First, in embodiments shown below, terms and English acronyms and abbreviations, such as an optical signal processing module, coupling, and output, are examples provided for ease of description, and shall not constitute any limitation on this application. This application does not exclude a possibility of defining another term that can implement a same or similar function in an existing or future protocol.

Second, the terms "first", "second", and various numbers in the following embodiments are merely used for differentiation for ease of description, and are not used to limit the scope of embodiments. For example, different optical signals and different components are distinguished.

Third, "at least one" indicates one or more, and "a plurality of" indicates two or more. In addition, "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. At least one of the following items (pieces) or a similar expression thereof indicates any combination of these items, including a single item (piece) or any combination of a plurality of items (pieces). For example, at least one of a, b, and c may indicate: a, or b, or c, a and b, a and c, b and c, or a, b, and c, where a, b, and c may be singular or plural.

The following describes embodiments in detail with reference to accompanying drawings.

FIG. 1 is a schematic block diagram of a system architecture 100 according to an embodiment. The system architecture 100 includes a remote unit (RU), an optical fiber, and a local unit (LU). The RU is configured to receive an RF signal and generate an LO signal, adjust the RF signal and the LO signal to an optical carrier for orthogonal polarization multiplexing, to obtain an orthogonal polarization multiplexing optical signal carrying the RF signal and the LO signal, and then transmit the optical signal to the LU through the optical fiber. The LU is configured to perform projection, detection, analog-to-digital conversion, and digital signal processing on the orthogonal polarization multiplexed optical signal, to finally restore a baseband signal.

It should be understood that the optical fiber may be any non-polarization maintaining optical fiber. This is not limited in this embodiment.

For example, the RU may be a macro base station or a micro wireless base station. This is not limited in this embodiment.

The macro base station and the micro wireless base station are collectively referred to as a base station, and may be an evolved NodeB (eNB or eNodeB) in an LTE system, or may be a home NodeB (for example, home evolved NodeB, or home NodeB, HNB) or a baseband unit (BBU), or may be a radio controller in a cloud radio access network (CRAN) scenario, or may be an access point (AP) in a WLAN, or may be a gNB in a new radio (NR) system, or may be a satellite base station or the like in a satellite communication system. This is not limited in this embodiment.

Figure 2:
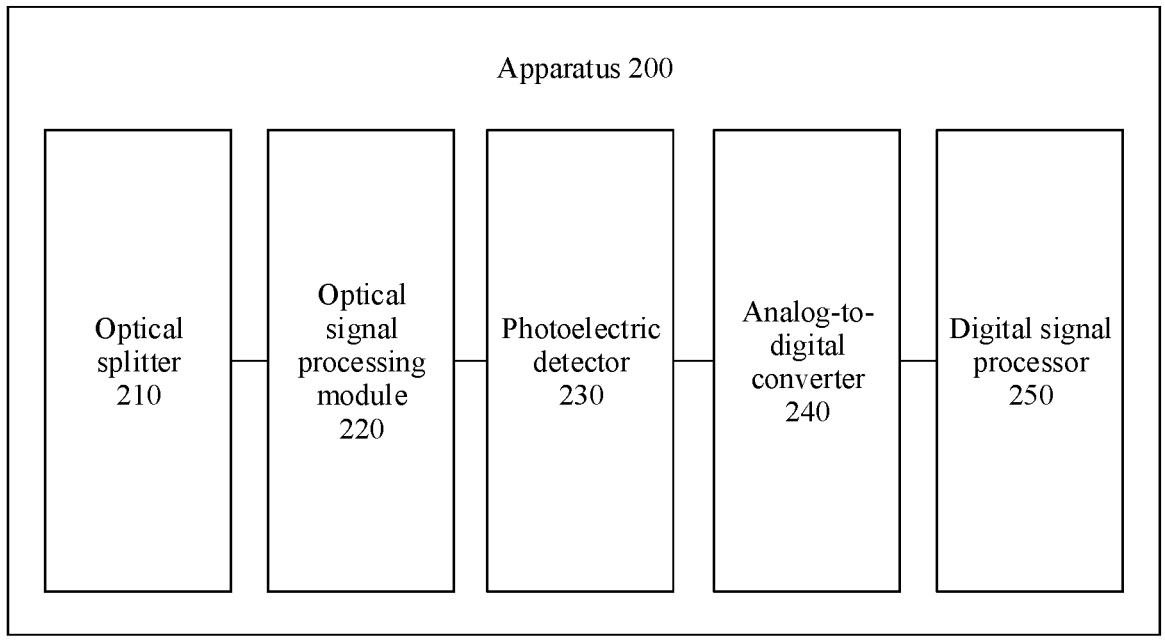
FIG. 2 is a schematic block diagram of a signal receiving apparatus according to an embodiment.

FIG. 2 is a schematic block diagram of a signal receiving apparatus 200 according to an embodiment. The signal receiving apparatus 200 includes an optical splitter 210, an optical signal processing module 220, a photoelectric detector 230, an analog-to-digital converter 240, and a digital signal processor 250.

The optical splitter 210 is configured to: receive a first polarization multiplexing optical signal from a remote apparatus, split the first polarization multiplexing optical signal into at least two paths to obtain at least two second polarization multiplexing optical signals, and input the at least two second polarization multiplexing optical signals into at least two optical signal processing modules 220 respectively, where the first polarization multiplexing optical signal is obtained by modulating a radio frequency signal and a local oscillator signal to two orthogonal polarization states of an optical carrier respectively. The optical signal processing module 220 is configured to couple the second polarization multiplexing optical signal to obtain a linearly polarized optical signal, and input the linearly polarized optical signal to the photoelectric detector 230. The photoelectric detector 230 is configured to convert the linearly polarized optical signal into an analog signal, and input the analog signal to the analog-to-digital converter 240. The analog-to-digital converter 240 is configured to perform analog-to-digital conversion on the analog signal to obtain a digital signal, and input the digital signal to the digital signal processor 250. The digital signal processor 250 is configured to process the digital signal to obtain a baseband signal.

According to the signal receiving apparatus in this embodiment, at least three mutually independent analog signals are output, analog-to-digital conversion is performed on the at least three analog signals, then the at least three analog signals are input to the digital signal processor for digital processing, and IQ signal is restored in a digital domain. Therefore, a circuit architecture does not need to precisely control an orthogonal polarization state of light. In this way, the circuit architecture can easily restore a baseband signal, and reduce system costs.

It should be understood that the remote apparatus may include an antenna, a bandpass filter, a low noise amplifier, a photoelectric modulator, a local oscillator, a laser, and an optical bandpass filter.

The antenna is configured to receive a first radio frequency signal, and input the first radio frequency signal to the bandpass filter. The bandpass filter is configured to filter the first radio frequency signal to obtain a second radio frequency signal, and input the second radio frequency signal to the low noise amplifier. The low noise amplifier is configured to amplify the second radio frequency signal to obtain a third radio frequency signal, and input the third radio frequency signal to one radio frequency input end of the photoelectric modulator. The local oscillator is configured to generate a local oscillator signal having a same frequency as the third radio frequency signal, and input the local oscillator signal to another radio frequency input end of the photoelectric modulator. The laser is configured to generate a fifth linearly polarized optical signal, and input the linearly polarized optical signal to an optical input end of the photoelectric modulator. The photoelectric modulator is configured to split the linearly polarized optical signal into an upper signal and a lower signal, separately perform optical domain modulation on the third radio frequency signal and the local oscillator signal by using the linearly polarized optical signal, to obtain orthogonal polarization multiplexing light, and input the orthogonal polarization multiplexing light to the optical bandpass filter. The optical bandpass filter is configured to filter the orthogonal polarization multiplexing light, to obtain an upper sideband signal or a lower sideband signal of the orthogonal polarization multiplexing light, and determine the upper sideband signal or the lower sideband signal as the first polarization multiplexing optical signal.

In an optional embodiment, the optical signal processing module 220 includes a polarization beam splitter and a polarizer. The photoelectric detector 230 includes a first photoelectric detector, a second photoelectric detector, and a third photoelectric detector. The analog-to-digital converter 240 includes a first analog-to-digital converter, a second analog-to-digital converter, and a third analog-to-digital converter.

The polarization beam splitter is configured to couple and output the second polarization multiplexing optical signal to two main axes of the polarization beam splitter, to obtain a first linearly polarized optical signal and a second linearly polarized optical signal, input the first linearly polarized optical signal to the first photoelectric detector, and input the second linearly polarized optical signal to the second photoelectric detector. The polarizer is configured to couple and output the second polarization multiplexing optical signal to a main axis of the polarizer, to obtain a third linearly polarized optical signal, and input the third linearly polarized optical signal to the third photoelectric detector. The first photoelectric detector is configured to convert the first linearly polarized optical signal into a first analog signal, and input the first analog signal to the first analog-to-digital converter. The second photoelectric detector is configured to convert the second linearly polarized optical signal into a second analog signal, and input the second analog signal to the second analog-to-digital converter. The third photoelectric detector is configured to convert the third linearly polarized optical signal into a third analog signal, and input the third analog signal to the third analog-to-digital converter. The first analog-to-digital converter is configured to perform analog-to-digital conversion on the first analog signal to obtain a first digital signal, and input the first digital signal to the digital signal processor. The second analog-to-digital converter is configured to perform analog-to-digital conversion on the second analog signal to obtain a second digital signal, and input the second digital signal to the digital signal processor. The third analog-to-digital converter is configured to perform analog-to-digital conversion on the third analog signal to obtain a third digital signal, and input the third digital signal to the digital signal processor. The digital signal processor is configured to process the first digital signal, the second digital signal, and the third digital signal to obtain the baseband signal.

According to this embodiment, three mutually independent analog signals are output, analog-to-digital conversion is performed on the three analog signals, then the three analog signals are input to the digital signal processor for digital processing, and IQ signal is restored in a digital domain. Therefore, the circuit architecture does not need to precisely control an orthogonal polarization state of light. In this way, the circuit architecture can easily restore a baseband signal, and reduce system costs.

In an optional embodiment, at least one of a first polarization controller and a first optical fiber is disposed between the optical splitter 210 and the polarization beam splitter, and the first polarization controller or the first optical fiber is configured to adjust a polarization state of the second polarization multiplexing optical signal; and/or at least one of a second polarization controller and a second optical fiber is disposed between the optical splitter 210 and the polarizer, and the second polarization controller or the second optical fiber is configured to adjust a polarization state of the second polarization multiplexing optical signal.

It should be understood that a polarization state of an optical signal is adjusted to ensure that the three output analog signals are independent of each other.

In an optional embodiment, the optical signal processing module 220 includes a first polarization beam splitter and a second polarization beam splitter, the photoelectric detector 230 includes a first photoelectric detector, a second photoelectric detector, a third photoelectric detector, and a fourth photoelectric detector, and the analog-to-digital converter 240 includes a first analog-to-digital converter, a second analog-to-digital converter, a third analog-to-digital converter, and a fourth analog-to-digital converter.

The first polarization beam splitter is configured to couple and output the second polarization multiplexing optical signal to two main axes of the first polarization beam splitter to obtain a first linearly polarized optical signal and a second linearly polarized optical signal, input the first linearly polarized optical signal to the first photoelectric detector, and input the second linearly polarized optical signal to the second photoelectric detector. The second polarization beam splitter is configured to couple and output the second polarization multiplexing optical signal to two main axes of the second polarization beam splitter to obtain a third linearly polarized optical signal and a fourth linearly polarized optical signal, input the third linearly polarized optical signal to the third photoelectric detector, and input the fourth linearly polarized optical signal to the fourth photoelectric detector. The first photoelectric detector is configured to convert the first linearly polarized optical signal into a first analog signal, and input the first analog signal to the first analog-to-digital converter. The second photoelectric detector is configured to convert the second linearly polarized optical signal into a second analog signal, and input the second analog signal to the second analog-to-digital converter. The third photoelectric detector is configured to convert the third linearly polarized optical signal into a third analog signal, and input the third analog signal to the third analog-to-digital converter. The fourth photoelectric detector is configured to convert the fourth linearly polarized optical signal into a fourth analog signal, and input the fourth analog signal to the fourth analog-to-digital converter. The first analog-to-digital converter is configured to perform analog-to-digital conversion on the first analog signal to obtain a first digital signal, and input the first digital signal to the digital signal processor. The second analog-to-digital converter is configured to perform analog-to-digital conversion on the second analog signal to obtain a second digital signal, and input the second digital signal to the digital signal processor. The third analog-to-digital converter is configured to perform analog-to-digital conversion on the third analog signal to obtain a third digital signal, and input the third digital signal to the digital signal processor. The fourth analog-to-digital converter is configured to perform analog-to-digital conversion on the fourth analog signal to obtain a fourth digital signal, and input the fourth digital signal to the digital signal processor. The digital signal processor is configured to process the first digital signal, the second digital signal, the third digital signal, and the fourth digital signal to obtain the baseband signal.

According to this embodiment, four mutually independent analog signals are output, analog-to-digital conversion is performed on the four analog signals, then the four analog signals are input to the digital signal processor for digital processing, and IQ signal is restored in a digital domain. Therefore, the circuit architecture does not need to precisely control an orthogonal polarization state of light. In this way, the circuit architecture can easily restore a baseband signal, and reduce system costs.

In an optional embodiment, at least one of a first polarization controller and a first optical fiber is disposed between the optical splitter 210 and the first polarization beam splitter, and the first polarization controller or the first optical fiber is configured to adjust a polarization state of the second polarization multiplexing optical signal; and/or at least one of a first polarization controller and a first optical fiber is disposed between the optical splitter 210 and the second polarization beam splitter, and the first polarization controller or the first optical fiber is configured to adjust a polarization state of the second polarization multiplexing optical signal.

It should be understood that a polarization state of an optical signal is adjusted to ensure that the four output analog signals are independent of each other.

The following describes structures of the RU and the LU in detail with reference to schematic block diagrams (that is, FIG. 3 to FIG. 6) of four possible signal receiving systems according to embodiments.

Figure 3:
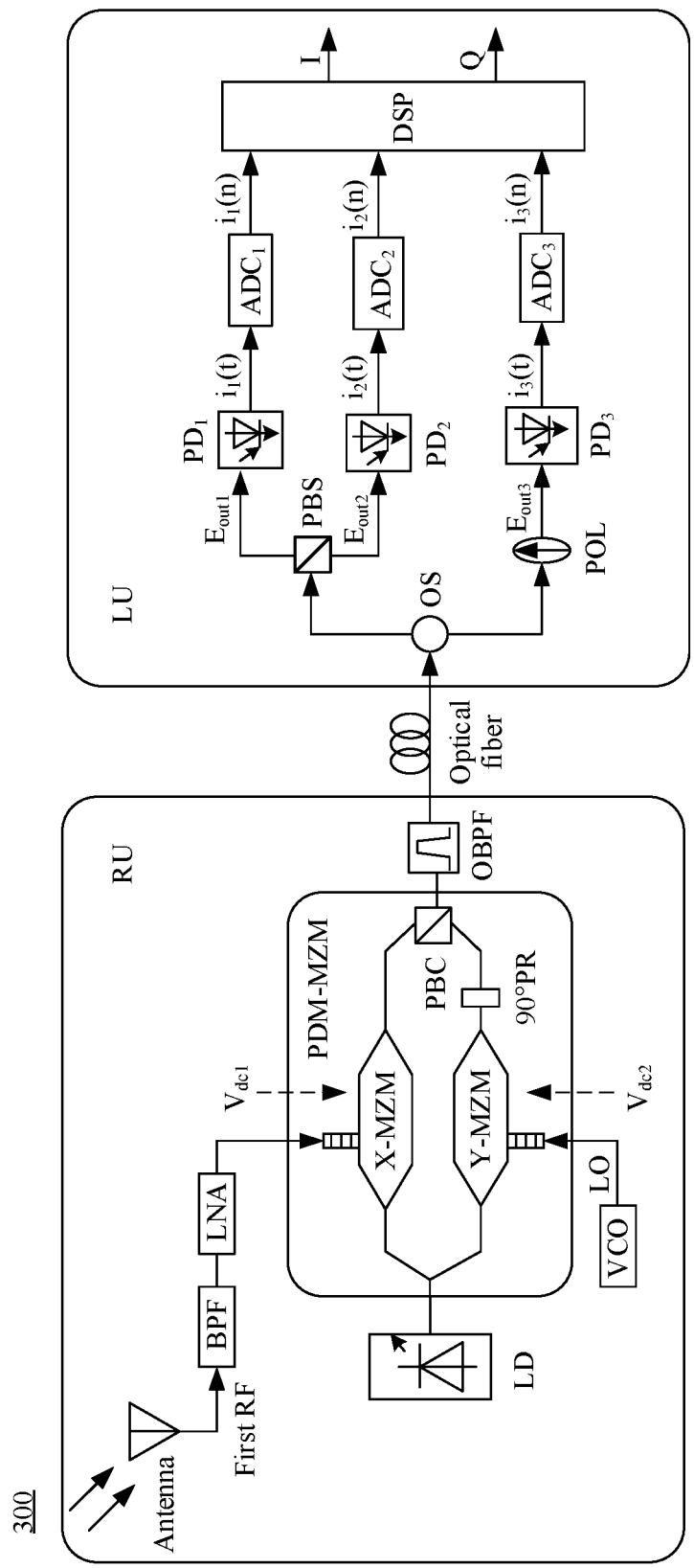
FIG. 3 is a schematic block diagram of a signal receiving system according to an embodiment.

FIG. 3 is a schematic block diagram of a signal receiving system 300 according to an embodiment. In the signal receiving system 300, an RU includes an antenna, a BPF, an LNA, an LD, a PDM-MZM, a VCO, and an OBPF. The PDM-MZM includes a 90° PR, a PBC, and two sub-modulators: an X-MZM and a Y-MZM. An LU includes an OS, a PBS, a POL, a first photoelectric detector $PD_1$, a second photoelectric detector $PD_2$, a third photoelectric detector $PD_3$, a first analog-to-digital converter $ADC_1$, a second analog-to-digital converter $ADC_2$, a third analog-to-digital converter $ADC_3$, and a DSP.

The antenna is connected to an input end of the BPF, an output end of the BPF is connected to an input end of the LNA, an output end of the LNA is connected to one radio frequency input end of the PDM-MZM, the VCO is connected to another radio frequency input end of the PDM-MZM, the LD is connected to an optical input end of the PDM-MZM, and an output end of the PDM-MZM is connected to an input end of the OBPF. An output end of the OBPF is connected to one end of an optical fiber, and the other end of the optical fiber is connected to an input end of the OS. One output end of the OS is connected to an input end of the PBS, one output end of the PBS is connected to an input end of the $PD_1$, an output end of the $PD_1$ is connected to an input end of the $ADC_1$, another output end of the PBS is connected to an input end of the $PD_2$, and an output end of the $PD_2$ is connected to an input end of the $ADC_2$. Another output end of the OS is connected to an input end of the POL, an output end of the POL is connected to an input end of the $PD_3$, an output end of the $PD_3$ is connected to an input end of the $ADC_3$, and an output end of the $ADC_1$, an output end of the $ADC_2$, and an output end of the $ADC_3$ are respectively connected to three input ends of the DSP.

In the RU in FIG. 3, the antenna is configured to receive an RF signal, and input the RF signal to the BPF. The BPF is configured to filter the RF signal to obtain a filtered RF signal, and input the filtered RF signal to the LNA. The LNA is configured to perform signal amplification on the filtered RF signal, to obtain an amplified RF signal, and input the amplified RF signal to one radio frequency input end of the PDM-MZM. The VCO is configured to generate an LO signal having a same frequency as the RF signal, and input the LO signal to another radio frequency input end of the PDM-MZM. The LD is configured to generate a beam of linearly polarized light, and input the linearly polarized light to the optical input end of the PDM-MZM. The PDM-MZM is configured to split the linearly polarized light into an upper signal and a lower signal, separately perform optical domain modulation on the amplified RF signal and the LO signal by using the linearly polarized light to obtain orthogonal polarization multiplexing light, and input the orthogonal polarization multiplexing light to the OBPF. The OBPF is configured to filter the orthogonal polarization multiplexing light to obtain an upper sideband signal or a lower sideband signal of the orthogonal polarization multiplexed light, and select one signal from the upper sideband signal or the lower sideband signal for sending. In this embodiment, the signal is referred to as a first polarization multiplexing optical signal.

The optical fiber is configured to receive the first polarization multiplexing optical signal sent by the OBPF, and transport the first polarization multiplexing optical signal to the input end of the OS in the LU after long-distance transmission.

In the LU in FIG. 3, the OS is configured to split the first polarization multiplexing optical signal to obtain two identical second polarization multiplexing optical signals. The PBS is configured to couple the second polarization multiplexing optical signal from the OS to obtain optical signals $E_{out1}$ and $E_{out2}$, input the $E_{out1}$ to the $PD_1$, and input the $E_{out2}$ to the $PD_2$. The POL is configured to couple the second polarization multiplexing optical signal from the OS to obtain an optical signal $E_{out3}$, and input the $E_{out3}$ to the $PD_3$. The $PD_1$ is configured to convert the $E_{out1}$ into an analog signal $i_1(t)$, and input the $i_1(t)$ to the $ADC_1$. The $PD_2$ is configured to convert the $E_{out2}$ into an analog signal $i_2(t)$, and input the $i_2(t)$ to the $ADC_2$. The $PD_3$ is configured to convert the $E_{out3}$ into an analog signal $i_3(t)$, and input the $i_3(t)$ to the $ADC_3$. The $ADC_1$ is configured to perform analog-to-digital conversion on the $i_1(t)$ to obtain a digital signal $i_1(n)$, and input the digital signal $i_1(n)$ to a first input end of the DSP. The $ADC_2$ is configured to perform analog-to-digital conversion on the $i_2(t)$ to obtain a digital signal $i_2(n)$, and input the digital signal $i_2(n)$ to a second input end of the DSP. The $ADC_3$ is configured to perform analog-to-digital conversion on the $i_3(t)$ to obtain a digital signal $i_3(n)$, and input the digital signal $i_3(n)$ to a third input end of the DSP. The DSP is configured to process the $i_1(n)$, the $i_2(n)$, and the $i_3(n)$ to obtain an IQ signal.

In this embodiment, in a process in which the DSP performs digital processing, different nonlinear compensation algorithms, for example, "a memory polynomial with a delay and a nonlinearity" and "a neural network algorithm", are used to resolve a delay and a nonlinear problem that exist in a system.

The following describes in detail an expression of each signal in this embodiment.

1. An expression of linearly polarized light generated by the LD is:

$$E_{in}=E_c e^{j\omega t} \tag{1}$$

Herein, $E_c$ is an output amplitude of the linearly polarized light, and ω is a frequency of the linearly polarized light.

An expression of an RF signal is:

$v_{RF}(t) = I \cos \Omega t + Q \sin \Omega t$, where

I is an in-phase component, Q is a quadrature component, and $\Omega$ is a radio frequency signal frequency.

An expression of an LO signal generated by the VCO is:

$v_{LO}(t) = v_{LO} \cos \Omega t$, where a frequency of the LO signal is the same as that of the RF signal.

2. $v_{RF}(t)$ is input to the sub-modulator X-MZM, to enable $V_{dc1}$ to work at a minimum point, that is, a phase difference between an upper channel and a lower channel in the sub-modulator X-MZM is $\pi$, to obtain an output signal of the sub-modulator X-MZM:

$$E_{X-MZM}(t) = \frac{1}{2\sqrt{2}} E_{in}(t) \left( e^{j\frac{\pi}{2V_\pi} v_{RF}(t)} - e^{-j\frac{\pi}{2V_\pi} v_{RF}(t)} \right) \qquad (2)$$

$$\approx \frac{1}{2\sqrt{2}} E_{in}(t) \left( \frac{\pi}{2V_\pi}(jI + Q)e^{j\Omega t} + \frac{\pi}{2V_\pi}(jI - Q)e^{-j\Omega t} \right)$$

$$= \frac{1}{4\sqrt{2} V_\pi} E_{in}(t) \left( (jI + Q)e^{j\Omega t} + (jI - Q)e^{-j\Omega t} \right)$$

After the higher-order term in the formula (2) is ignored, $E_{X-MZM}(t)$ includes only signals of an $\omega+\Omega$ sideband and an $\omega-\Omega$ sideband, that is, an optical carrier is suppressed.

3. Similarly, $v_{RF}(t)$ is input to the sub-modulator Y-MZM, to enable $V_{dc2}$ to work at a minimum working point, to obtain an output signal of the sub-modulator Y-MZM:

$$E_{Y-MZM}(t) = \qquad (3)$$

$$\frac{1}{2\sqrt{2}} E_{in}(t) \left( e^{j\frac{\pi}{2V_\pi} v_{LO}(t)} - e^{-j\frac{\pi}{2V_\pi} v_{LO}(t)} \right) \approx \frac{1}{4\sqrt{2} V_\pi} E_{in}(t) v_{LO}(e^{j\Omega t} - e^{-j\Omega t})$$

After the higher-order term in the formula (3) is ignored, $E_{Y-MZM}(t)$ includes only signals of an $\omega+\Omega$ sideband and an $\omega-\Omega$ sideband, that is, an optical carrier is suppressed.

4. The optical signal $E_{Y-MZM}(t)$ is combined with the optical signal $E_{X-MZM}(t)$ into one polarization multiplexed optical signal through the PBC after passing through the 90° PR. The expression is as follows:

$$E_{PDM-MZM}(t) = \vec{e_{TE}} E_{X-MZM}(t) + \vec{e_{TM}} E_{Y-MZM}(t) \qquad (4)$$

$$= \vec{e_{TE}} \left( \frac{\pi}{4\sqrt{2} V_\pi} E_{in}(t) \left( (jI + Q)e^{j\Omega t} + (jI - Q)e^{-j\Omega t} \right) \right) +$$

$$\vec{e_{TM}} \left( \frac{\pi}{4\sqrt{2} V_\pi} E_{in}(t) v_{LO} \left( e^{j\Omega t} - e^{-j\Omega t} \right) \right)$$

5. The optical signal $E_{PDM-MZM}(t)$ in the formula (4) includes two orthogonal polarization state optical signals in transverse electric wave (TE) and transverse magnetic wave (TM) polarization states, where an IQ signal of a baseband signal is included in the optical signal in the TE polarization state, and an LO signal is included in the optical signal in the TM polarization state.

In addition, the optical signal $E_{PDM-MZM}(t)$ in the formula (4) includes optical signals of an upper sideband $\omega+\Omega$ and a lower sideband $\omega-\Omega$. The lower sideband $\omega-\Omega$ may be filtered out and the upper sideband $\omega+\Omega$ may be reserved by using the OBPF (or the lower sideband $\omega-\Omega$ is reserved and the upper sideband $\omega+\Omega$ is filtered out), to obtain an output result of the OBPF:

$$E_{OBPF}(t) = \vec{e_{TE}} \left( \frac{\pi}{4\sqrt{2} V_\pi} E_{in}(jI + Q)e^{j\Omega t} \right) + \vec{e_{TM}} \left( \frac{\pi}{4\sqrt{2} V_\pi} E_{in} v_{LO} e^{j\Omega t} \right) \qquad (5)$$

6. An optical signal $E_{OBPF}(t)$ output by the OBPF is transmitted to the LU through the optical fiber, and the OS in the LU splits the $E_{OBPF}(t)$ into two identical optical signals, where one optical signal enters the PBS to obtain $E_{out1}$ and $E_{out2}$, the other optical signal enters the POL to obtain $E_{out3}$, and an expression thereof may be uniformly expressed as $E_{outk}$:

$$(6)$$

$$E_{outk}(t) = \frac{\pi}{4\sqrt{2} V_\pi} E_{in}(t)(jI + Q)e^{j\Omega t} \cos\alpha_k + j\frac{\pi}{4\sqrt{2} V_\pi} E_{in}(t) v_{LO} e^{j\Omega t} \sin\alpha_k$$

$$= \frac{\pi}{4\sqrt{2} V_\pi} E_c e^{j\omega_c t} e^{j\Omega t} ((jI + Q)\cos\alpha_k + jv_{LO}\sin\alpha_k)$$

Herein, k=1, 2, 3, $\alpha_1$ and $\alpha_2$ are included angles between an optical signal entering a PBS1 and a main axis of the PBS1, and $\alpha_3$ is an included angle between an optical signal entering the POL and a main axis of the polarizer POL.

7. After the foregoing optical signal $E_{outk}(t)$ is beat by using the PD, the following may be obtained:

$$i_k(t) = \eta E_k(t) * E_k^*(t) \qquad (7)$$

$$= \frac{\pi^2}{32 V_\pi^2} \eta E_c^2 ((jI + Q)\cos\alpha_k + jv_{LO}\sin\alpha_k) \cdot$$

$$((-jI + Q)\cos\alpha_k - jv_{LO}\sin\alpha_k)$$

$$= \frac{\pi^2}{32 V_\pi^2} \eta E_0^2 (v_{LO}\sin2\alpha_k \cos\delta_k \cdot I - v_{LO}\sin2\alpha_k \sin\delta_k \cdot$$

$$Q + \cos^2\alpha_k (I^2 + Q^2) + v_{LO}^2 \sin^2\alpha_k)$$

$$= A_k I + B_k Q + C_k (I^2 + Q^2) + D_k$$

8. A photoelectric current $i_k(t)$ output by the PD may be converted into a digital signal $i_k(n)$ by using the ADC. For example, the digital signal $i_k(n)$ may be written in a matrix form according to the formula (7), that is:

$$\begin{bmatrix} i_1(n) \\ i_2(n) \\ i_3(n) \end{bmatrix} = \begin{bmatrix} A_1 & B_1 & C_1 & D_1 \\ A_2 & B_2 & C_2 & D_2 \\ A_3 & B_3 & C_3 & D_3 \end{bmatrix} \begin{bmatrix} I(n) \\ Q(n) \\ I^2(n) + Q^2(n) \\ 1 \end{bmatrix} \qquad (8)$$

9. Digital signal processing is performed on the digital signal $i_k(n)$ by using the DSP, so that a baseband IQ signal can be restored. For example, an IQ signal of the baseband signal may be obtained by inversion of the matrix in the formula (8):

$$\begin{bmatrix} I(n) \\ Q(n) \\ I^2(n)+Q^2(n) \\ 1 \end{bmatrix} = \begin{bmatrix} a_1 & a_2 & a_3 \\ b_1 & b_2 & b_3 \\ c_1 & c_2 & c_3 \\ d_1 & d_2 & d_3 \end{bmatrix} \begin{bmatrix} i_1(n) \\ i_2(n) \\ i_3(n) \end{bmatrix} \qquad (9)$$

The IQ signal in the formula (9) may be expressed as:

$$I(n) = \sum_{k=1}^{3} a_k i_k(n) \qquad (10)$$

$$Q(n) = \sum_{k=1}^{3} b_k i_k(n)$$

When the coefficients $a_k$ and $b_k$ in the formula (10) are determined, the IQ signal may be restored by using the formula (10). Herein, $a_k$ corresponds to $a_1$, $a_2$, and $a_3$ in the formula (9), and $b_k$ corresponds to $b_1$, $b_2$, and $b_3$ in the formula (9).

Because the system has a delay and nonlinearity, the DSP in this embodiment may use a memory polynomial to restore the baseband signal, to help resolve a problem of the delay and nonlinearity of the system.

For example, the IQ signal may be restored by using the following expressions respectively:

$$I(n) = \sum_{k=1}^{3} \sum_{q=0}^{N} \sum_{p=0}^{M} a_{kqp} i_k^q(n-p) \qquad (11)$$

$$Q(n) = \sum_{k=1}^{3} \sum_{q=0}^{N} \sum_{p=0}^{M} b_{kqp} i_k^q(n-p)$$

When the coefficients $a_{kqp}$ and $b_{kqp}$ in the formula (11) are determined, the IQ signal may be restored by using the formula (11). The memory polynomial is an algorithm preset in the DSP, and the coefficients $a_{kqp}$ and $b_{kqp}$ are determined by the algorithm preset in the DSP.

In this embodiment, the three independent analog signals $i_1(t)$, $i_2(t)$, and $i_3(t)$ are output, analog-to-digital conversion is performed on the three analog signals, then the three analog signals are input to the DSP for digital processing, and IQ signal is restored in a digital domain. Therefore, the circuit architecture does not need to precisely control an orthogonal polarization state of light. In addition, the circuit architecture can easily restore a baseband signal, and can help improve system stability. In addition, because the LU is insensitive to a polarization state of light transmitted by the RU, an optical signal may be transmitted by using a non-polarization maintaining optical fiber. This reduces system development costs. In addition, in a digital processing stage, the IQ signal of the baseband signal are restored by using different algorithms, so that a non-linear problem existing in the system can be resolved, and system performance is greatly improved.

Optionally, a PC is disposed between the OS and the PBS, and/or an optical fiber is disposed between the OS and the PBS.

Optionally, a PC is disposed between the OS and the POL, and/or an optical fiber is disposed between the OS and the POL.

Optionally, a PC is separately disposed between the OS and the PBS and between the OS and the POL, and/or an optical fiber is separately disposed between the OS and the PBS and between the OS and the POL.

The PC and/or the optical fiber are/is configured to adjust a polarization state of the second polarization multiplexing optical signal from the OS. Setting the PC and/or the optical fiber can ensure that $i_1(t)$, $i_2(t)$, and $i_3(t)$ are independent of each other, thereby improving accuracy of the IQ signal restored by the LU.

Figure 4:
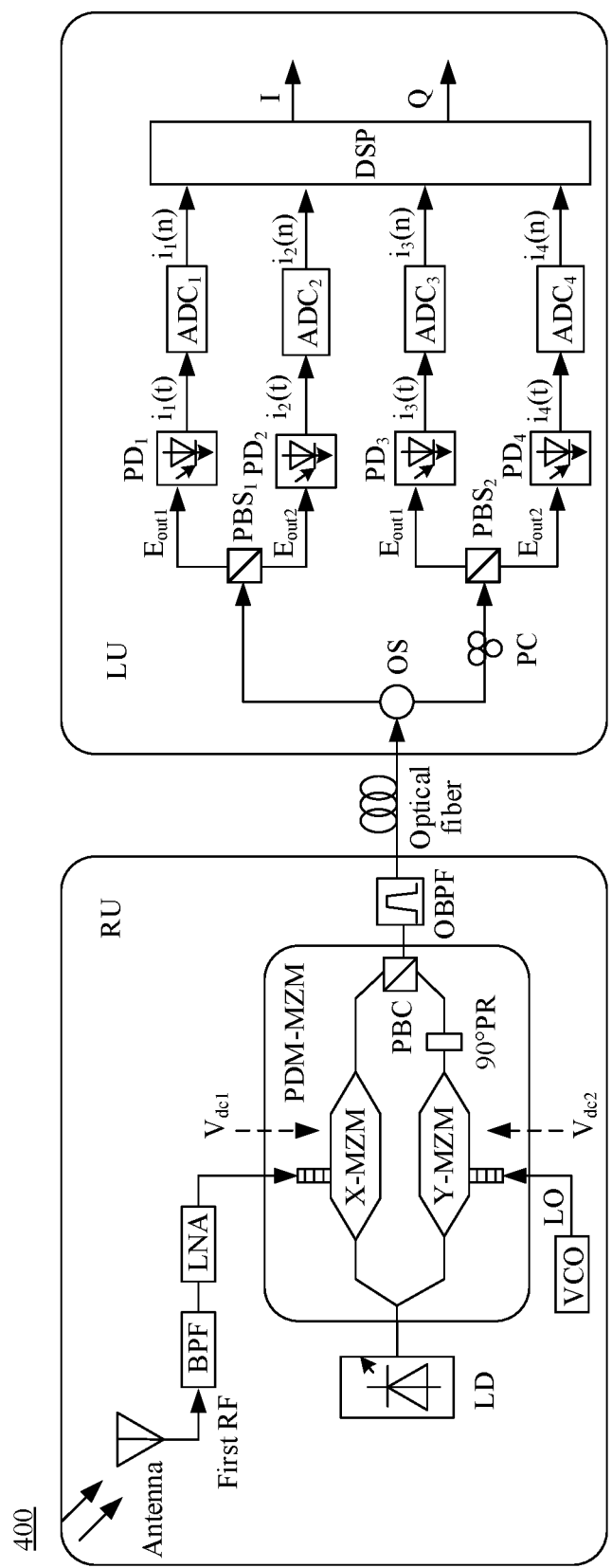
FIG. 4 is a schematic block diagram of another signal receiving system according to an embodiment.

FIG. 4 is a schematic block diagram of another signal receiving system 400 according to this application. In the signal receiving system 400, an RU is similar to the RU in the system 300. For details, refer to related descriptions of the RU in the system 300. Details are not described herein again. The LU in the system 400 includes an OS, a first polarization beam splitter $PBS_1$, a second polarization beam splitter $PBS_2$, a first photoelectric detector $PD_1$, a second photoelectric detector $PD_2$, a third photoelectric detector $PD_3$, a fourth photoelectric detector $PD_4$, a first analog-to-digital converter $ADC_1$, a second analog-to-digital converter $ADC_2$, a third analog-to-digital converter $ADC_3$, a fourth analog-to-digital converter $ADC_4$, and a DSP.

In the LU in FIG. 4, one output end of the OS is connected to an input end of the $PBS_1$, one output end of the PBS is connected to an input end of the $PD_1$, and an output end of the $PD_1$ is connected to an input end of the $ADC_1$ Another output end of the $PBS_1$ is connected to an input end of the $PD_2$, and an output end of the $PD_2$ is connected to an input end of the $ADC_2$. Another output end of the OS is connected to an input end of the PC, an output end of the PC and one output end of the $PBS_2$ are connected to an input end of the $PD_3$, and an output end of the $PD_3$ is connected to an input end of the $ADC_3$. Another output end of the $PBS_2$ is connected to an input end of the $PD_4$, and an output end of the $PD_4$ is connected to an input end of the $ADC_4$. An output end of the $ADC_1$, an output end of the $ADC_2$, an output end of the $ADC_3$, and an output end of the $ADC_4$ are respectively connected to four input ends of the DSP.

The OS is configured to split the first polarization multiplexing optical signal to obtain two identical second polarization multiplexing optical signals. The $PBS_1$ is configured to couple the second polarization multiplexing optical signal from the OS to obtain an optical signal $E_{out1}$ and an optical signal $E_{out2}$, input the $E_{out1}$ to the $PD_1$, and input the $E_{out2}$ to the $PD_2$. The $PBS_2$ is configured to couple the second polarization multiplexing optical signal from the OS to obtain an optical signal $E_{out3}$ and an optical signal $E_{out4}$, input the $E_{out3}$ to the $PD_3$, and input the $E_{out4}$ to the $PD_4$. The $PD_1$ is configured to convert the $E_{out1}$ into an analog signal $i_1(t)$, and input the $i_1(t)$ to the $ADC_1$. The $PD_2$ is configured to convert the $E_{out2}$ into an analog signal $i_2(t)$, and input the $i_2(t)$ to the $ADC_2$. The $PD_3$ is configured to convert the $E_{out3}$ into an analog signal $i_3(t)$, and input the $i_3(t)$ to the $ADC_3$. The $PD_4$ is configured to convert the $E_{out4}$ into an analog signal $i_4(t)$, and input the $i_4(t)$ to the $ADC_4$. The $ADC_1$ is configured to perform analog-to-digital conversion on the $i_1(t)$ to obtain a digital signal $i1(n)$, and input the $i_1(n)$ to a first input end of the DSP. The $ADC_2$ is configured to perform analog-to-digital conversion on the $i_2(t)$ to obtain a digital signal $i_2(n)$, and input the $i_2(n)$ to a second input end of the DSP. The $ADC_3$ is configured to perform analog-to-digital conversion on the $i_3(t)$ to obtain a digital signal $i_3(n)$, and input the $i_3(n)$ to a third input end of the DSP. The $ADC_4$ is configured to perform analog-to-digital conversion on the $i_4(t)$ to obtain a digital signal $i_4(n)$, and input the $i_4(n)$ to a fourth input end of the DSP. The DSP is configured to perform digital processing on the $i_1(n)$, $i_2(n)$, $i_3(n)$, and $i_4(n)$, to obtain an IQ signal of a baseband signal. The PC is configured to adjust a polarization state of the second polarization multiplexing optical signal from the OS, so that the $i_1(t)$, $i_2(t)$, $i_3(t)$, and $i_4(t)$ are independent of each other.

For an algorithm and a digital processing process used by the DSP, refer to related descriptions in the foregoing system 200. Details are not described herein again.

In this embodiment, a PC is disposed to adjust a polarization state of light, to ensure that the four output signals $i_1(t)$, $i_2(t)$, $i_3(t)$, and $i_4(t)$ are independent of each other. After analog-to-digital conversion is performed on the four output signals, the four output signals are input to the DSP for digital processing, and IQ signal restoration is completed in a digital domain. Therefore, a circuit architecture does not need to precisely control an orthogonal polarization state of light, and the circuit architecture can easily restore a baseband signal, and can help improve system stability. In addition, because the LU is insensitive to a polarization state of light transmitted by the RU, an optical signal may be transmitted by using a non-polarization maintaining optical fiber. This reduces system development costs. In addition, in a digital processing stage, the IQ signal of the baseband signal is restored by using different algorithms, so that a non-linear problem existing in the system can be resolved, and system performance is greatly improved.

Figure 5:
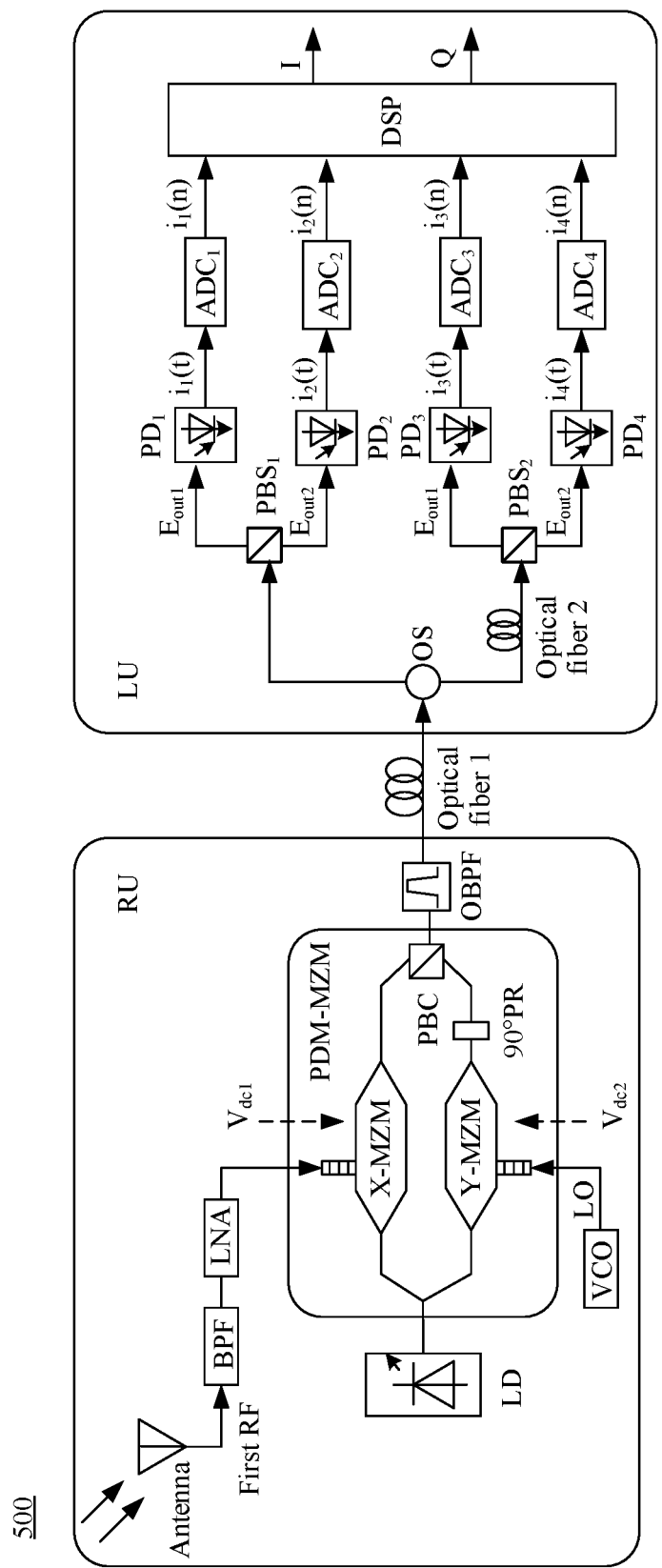
FIG. 5 is a schematic block diagram of still another signal receiving system according to an embodiment.

FIG. 5 is a schematic block diagram of still another signal receiving system 500 according to this application. In the signal receiving system 500, an RU is similar to that in the system 300. For details, refer to related descriptions of the RU in the system 300. Details are not described herein again. Based on the system 400, the LU replaces a PC disposed between the OS of the LU and the $PBS_2$ in the system 400 with an optical fiber. For ease of differentiation, in this embodiment, an optical fiber between the RU and the LU is referred to as an optical fiber 1, and an optical fiber between the OS and the $PBS_2$ is referred to as an optical fiber 2.

The optical fiber 2 is configured to adjust a polarization state of a second polarization multiplexing optical signal from the OS, so that $i_1(t)$, $i_2(t)$, $i_3(t)$, and $i_4(t)$ are independent of each other. Other components in the LU are similar to those in the system 400. For details, refer to related descriptions of the LU in the system 400. Details are not described herein again.

In this embodiment, the four independent output analog signals $i_1(t)$, $i_2(t)$, $i_3(t)$, and $i_4(t)$ are output. After analog-to-digital conversion is performed on the four analog signals, the four analog signals are input to the DSP for digital processing, and IQ signal restoration is completed in a digital domain. Therefore, a circuit architecture does not need to precisely control an orthogonal polarization state of light, and the circuit architecture can easily restore a baseband signal, and can help improve system stability. Compared with the polarization controller PC, the optical fiber is used to adjust a polarization state of light, which has advantages of low costs and small loss. In addition, because the LU is insensitive to a polarization state of light transmitted by the RU, an optical signal may be transmitted by using a non-polarization maintaining optical fiber. This reduces system development costs. In a digital processing stage, an IQ signal of a baseband signal is restored by using different algorithms, so that a non-linear problem existing in the system can be resolved, and system performance is greatly improved.

Optionally, at least one of the PC and the optical fiber 2 is disposed between the OS and the $PBS_1$.

Optionally, at least one of the PC and the optical fiber 2 is disposed between the OS and the $PBS_2$.

Optionally, at least one of the PC and the optical fiber 2 is separately disposed between the OS and the PBS' and between the OS and the $PBS_2$.

Figure 6:
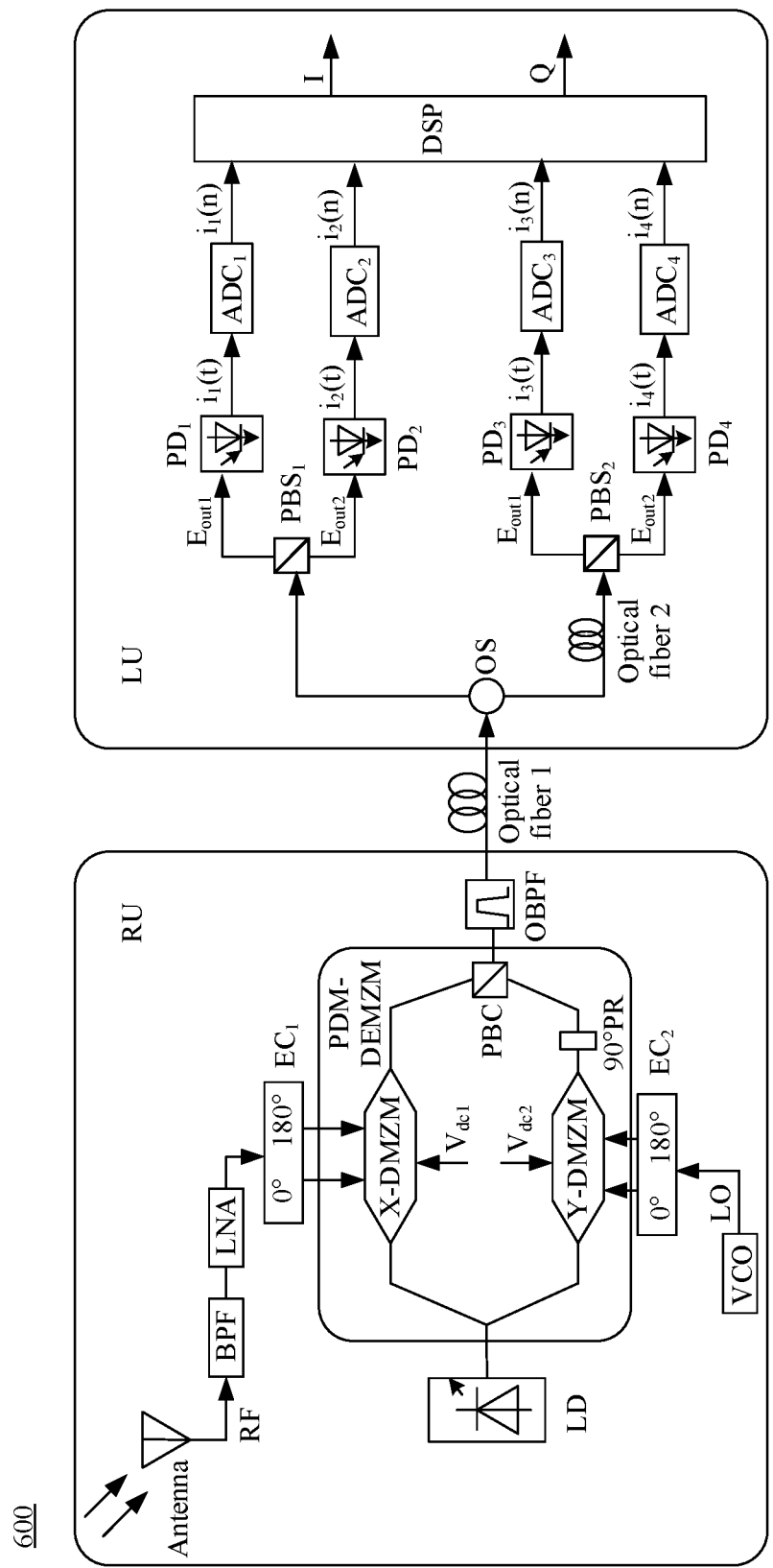
FIG. 6 is a schematic block diagram of yet another signal receiving system according to an embodiment.

FIG. 6 is a schematic block diagram of yet another signal receiving system 600 according to this application. In the signal receiving system 600, an RU includes an antenna, a BPF, an LNA, a first electrical coupler $EC_1$, a second electrical coupler $EC_2$, an LD, a PDM-DEMZM, a VCO, and an OBPF. The PDM-DEMZM includes a 90° PR, a PBC, and two sub-modulators: an X-DEMZM and a Y-DEMZM. The LU is similar to that in the foregoing system 500. For details, refer to related descriptions of the LU in the system 500. Details are not described herein again.

In the RU in FIG. 6, the antenna is connected to an input end of the BPF, an output end of the BPF is connected to an input end of the LNA, an output end of the LNA is connected to an input end of the $EC_1$, an output end of the $EC_1$ is connected to two radio frequency input ends of the X-DEMZM of the PDM-DEMZM, the VCO is connected to an input end of the $EC_2$, an output end of the $EC_2$ is connected to two radio frequency input ends of the Y-DEMZM of the PDM-DEMZM, the LD is connected to an optical input end of the PDM-DEMZM, and an output end of the PDM-DEMZM is connected to an input end of the OBPF.

In the RU in FIG. 6, the antenna is configured to receive an RF signal, and input the RF signal to the BPF. The BPF is configured to filter the RF signal to obtain a filtered RF signal, and input the filtered RF signal to the LNA. The LNA is configured to perform signal amplification on the filtered RF signal, to obtain an amplified RF signal, and input the amplified RF signal to the $EC_1$. The $EC_1$ is configured to receive the amplified RF signal, electrically couple the amplified RF signal, and input a coupled RF signal to the two radio frequency input ends of the X-DEMZM. The X-DEMZM is configured to modulate the coupled RF signal, to obtain an optical signal carrying the RF signal. The VCO is configured to generate an LO signal having a same frequency as the RF, and input the LO signal to the $EC_2$. The $EC_2$ is configured to receive the LO signal, electrically couple the LO signal to obtain a coupled LO signal, and input the coupled LO signal to the two radio frequency input ends of the Y-DEMZM. The Y-DEMZM is configured to modulate the coupled LO signal to obtain an optical signal carrying the LO signal. The LD is configured to generate a beam of linearly polarized light, and input the linearly polarized light to the optical input end of the PDM-DEMZM. The PDM-DEMZM is configured to split the linearly polarized light into an upper signal and a lower signal, separately perform optical domain modulation on the amplified RF signal and the coupled LO signal by using the linearly polarized light, to obtain orthogonal polarization multiplexing light, and input the orthogonal polarization multiplexing light to the OBPF. The OBPF is configured to filter the orthogonal polarization multiplexing light to obtain an upper sideband signal or a lower sideband signal of the orthogonal polarization multiplexing light, and select one signal from the upper sideband signal or the lower sideband signal for sending. In this embodiment, the signal is referred to as a first polarization multiplexing optical signal.

In this embodiment, the four independent output analog signals $i_1(t)$, $i_2(t)$, $i_3(t)$, and $i_4(t)$ are output. After analog-to-digital conversion is performed on the four analog signals, the four analog signals are input to a DSP for digital processing, and IQ signal restoration is completed in a digital domain. Therefore, a circuit architecture does not need to precisely control an orthogonal polarization state of light, and the circuit architecture can easily restore a baseband signal, and can help reduce system development costs. Compared with a polarization controller PC, an optical fiber is used to adjust a polarization state of light, which has advantages of low costs and small loss. In addition, because the LU is insensitive to a polarization state of light transmitted by the RU, an optical signal may be transmitted by using a non-polarization maintaining optical fiber. This reduces system development costs. In a digital processing stage, an IQ signal of a baseband signal is restored by using different algorithms, so that a non-linear problem existing in the system can be resolved, and system performance is greatly improved.

Optionally, at least one of a PC and an optical fiber 2 is disposed between an OS and a $PBS_1$.

Optionally, at least one of a PC and an optical fiber 2 is disposed between an OS and a $PBS_2$.

Optionally, at least one of a PC and an optical fiber 2 is separately disposed between an OS and a $PBS_1$ and between the OS and a $PBS_2$.

Figure 7:
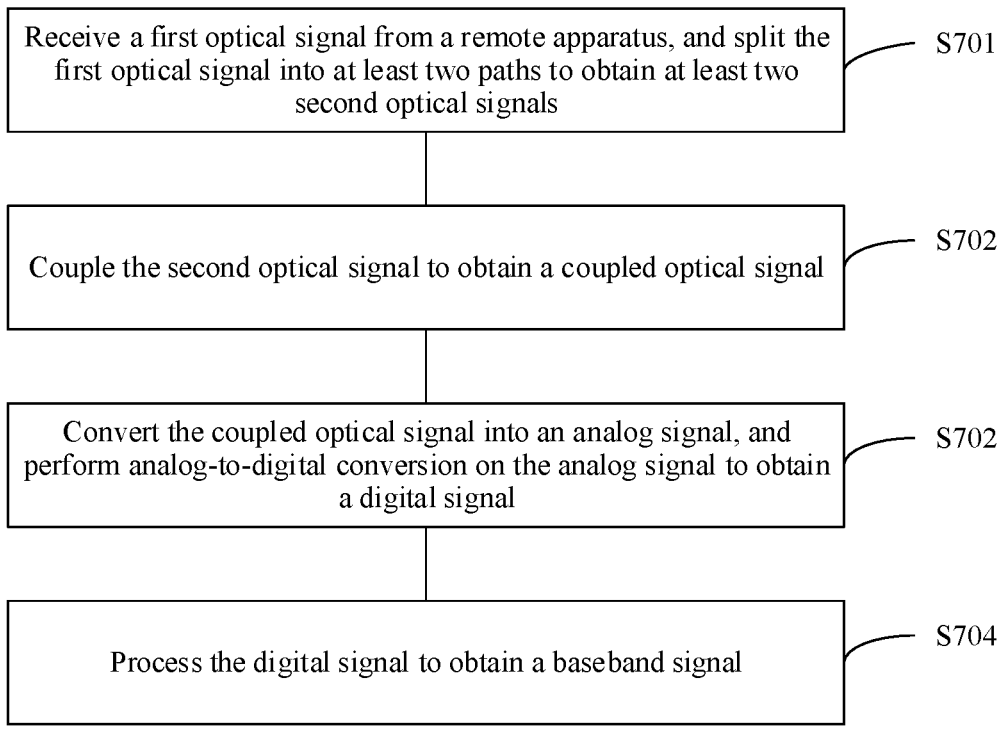
FIG. 7 is a schematic flowchart of a signal receiving method according to an embodiment.

FIG. 7 is a schematic flowchart of a signal receiving method. The method 700 according to an embodiment. The method 700 may be applied to the system architecture 100 shown in FIG. 1, but this embodiment is not limited thereto. In addition, the method 700 may be performed by the apparatus 200 shown in FIG. 2, that is, performed by the LU in the system architecture 100. As shown in FIG. 7, the method 700 may include the following steps.

S701: Receive a first polarization multiplexing optical signal from a remote apparatus, and split the first polarization multiplexing optical signal into at least two paths to obtain at least two second polarization multiplexing optical signals.

S702: Couple the second polarization multiplexing optical signal to obtain a linearly polarized optical signal.

S703: Convert the linearly polarized optical signal into an analog signal, and perform analog-to-digital conversion on the analog signal to obtain a digital signal.

S704: Process the digital signal to obtain a baseband signal.

According to the signal receiving method in this embodiment, at least three mutually independent analog signals are obtained, the at least three analog signals are converted into digital signals for digital processing, and IQ signal is restored in a digital domain. Therefore, according to the signal receiving method, there is no need to precisely control an orthogonal polarization state of light, and baseband signal restoration is easily implemented.

In an optional embodiment, the coupling the second polarization multiplexing optical signal to obtain a linearly polarized optical signal includes: coupling and outputting one of the at least two second polarization multiplexing optical signals to obtain a first linearly polarized optical signal and a second linearly polarized optical signal; and coupling and outputting another one of the at least two second polarization multiplexing optical signals to obtain a third linearly polarized optical signal.

The converting the linearly polarized optical signal into an analog signal, and performing analog-to-digital conversion on the analog signal to obtain a digital signal includes: converting the first linearly polarized optical signal into a first analog signal, and performing analog-to-digital conversion on the first analog signal to obtain a first digital signal; converting the second linearly polarized optical signal into a second analog signal, and performing analog-to-digital conversion on the second analog signal to obtain a second digital signal; and converting the third linearly polarized optical signal into a third analog signal, and performing analog-to-digital conversion on the third analog signal to obtain a third digital signal.

The processing the digital signal to obtain a baseband signal includes: processing the first digital signal, the second digital signal, and the third digital signal to obtain the baseband signal.

In an optional embodiment, the coupling and outputting one of the at least two second polarization multiplexing optical signals to obtain a first linearly polarized optical signal and a second linearly polarized optical signal includes: adjusting a polarization state of the second polarization multiplexing optical signal to obtain an adjusted optical signal; and coupling and outputting the adjusted optical signal to obtain the first linearly polarized optical signal and the second linearly polarized optical signal.

In an optional embodiment, the coupling and outputting another one of the at least two second polarization multiplexing optical signals to obtain a third linearly polarized optical signal includes: adjusting a polarization state of the another second polarization multiplexing optical signal to obtain another adjusted optical signal; and coupling and outputting the another adjusted optical signal to obtain the third linearly polarized optical signal.

In an optional embodiment, the coupling the second polarization multiplexing optical signals to obtain a linearly polarized optical signal includes: coupling and outputting one of the at least two second polarization multiplexing optical signals to obtain a first linearly polarized optical signal and a second linearly polarized optical signal; and coupling and outputting another one of the at least two second polarization multiplexing optical signals to obtain a third linearly polarized optical signal and a fourth linearly polarized optical signal.

The converting the linearly polarized optical signal into an analog signal, and performing analog-to-digital conversion on the analog signal to obtain a digital signal includes: converting the first linearly polarized optical signal into a first analog signal, and performing analog-to-digital conversion on the first analog signal to obtain a first digital signal; converting the second linearly polarized optical signal into a second analog signal, and performing analog-to-digital conversion on the second analog signal to obtain a second digital signal; converting the third linearly polarized optical signal into a third analog signal, and performing analog-to-digital conversion on the third analog signal to obtain a third digital signal; and converting the fourth linearly polarized optical signal into a fourth analog signal, and performing analog-to-digital conversion on the fourth analog signal to obtain a fourth digital signal.

The processing the digital signal to obtain a baseband signal includes: processing the first digital signal, the second digital signal, the third digital signal, and the fourth digital signal to obtain the baseband signal.

In an optional embodiment, the coupling and outputting one of the at least two second polarization multiplexing optical signals to obtain a first linearly polarized optical signal and a second linearly polarized optical signal includes: adjusting a polarization state of the second polarization multiplexing optical signal to obtain an adjusted optical signal; and coupling and outputting the adjusted optical signal to obtain the first linearly polarized optical signal and the second linearly polarized optical signal.

In an optional embodiment, the coupling and outputting another one of the at least two second polarization multiplexing optical signals to obtain a third linearly polarized optical signal and a fourth linearly polarized optical signal includes: adjusting a polarization state of the another second polarization multiplexing optical signal to obtain another adjusted optical signal; and coupling and outputting the another adjusted optical signal to obtain the third linearly polarized optical signal and the fourth linearly polarized optical signal.

It should be understood that a signal processing process in this embodiment is the same as that performed by the signal receiving apparatuses (namely, the LUs) described above with reference to FIG. 2 to FIG. 6. Because the foregoing has described in detail with reference to the accompanying drawings, for brevity, details are not described herein again.

It should be noted that, the foregoing describes the signal receiving apparatuses provided in embodiments with reference to the accompanying drawings. Modules in the signal receiving apparatuses may be implemented through hardware, or may be implemented through a combination of software and hardware. This is not limited in this application.

This application further provides a signal receiving system, including the foregoing signal receiving apparatus, remote apparatus, and optical fiber. For example, the signal receiving system may be shown in FIG. 3 to FIG. 6. For detailed descriptions, refer to the foregoing descriptions. Details are not described herein again.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in embodiments.

In addition, functional units in embodiments may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods according to embodiments. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations, but are not intended to limit the protection scope. Any variation or replacement readily figured out by a person skilled in the art within the technical scope disclosed in this application shall fall within the protection scope. Therefore, the protection scope shall be subject to the protection scope of the claims.

What is claimed is:

1. A signal receiving apparatus, comprising:
an optical splitter configured to:
  receive a first polarization multiplexing optical signal from a remote apparatus, the first polarization multiplexing optical signal being obtained by modulating a radio frequency signal and a local oscillator signal to two orthogonal polarization states of an optical carrier,
  split the first polarization multiplexing optical signal into at least two paths to obtain at least a second polarization multiplexing optical signal, and
  input the second polarization multiplexing optical signals into an optical signal processor;
the optical signal processor comprising a polarization beam splitter, the polarization beam splitter being configured to:
  couple the second polarization multiplexing optical signal to two main axes of the polarization beam splitter to obtain a first linearly polarized optical signal and a second linearly polarized optical signal,
  input the first linearly polarized optical signal to a first photoelectric detector, and
  input the second linearly polarized optical signal to a second photoelectric detector;
the first photoelectric detector, configured to:
  convert the first linearly polarized optical signal into a first analog signal, and
  input the first analog signal to a first analog-to-digital converter;
the second photoelectric detector, configured to:
  convert the second linearly polarized optical signal into a second analog signal, and
  input the second analog signal to a second analog-to-digital converter;
the first analog-to-digital converter, configured to:
  perform analog-to-digital conversion on the first analog signal to obtain a first digital signal, and input the first digital signal to a digital signal processor;
the second analog-to-digital converter, configured to:
perform analog-to-digital conversion on the second analog signal to obtain a second digital signal, and
input the second digital signal to the digital signal processor; and
the digital signal processor, configured to process the first digital signal and the second digital signal to obtain a baseband signal.

2. The apparatus according to claim 1, wherein the optical signal processor further comprises a polarizer configured to:
couple and output a third polarization multiplexing optical signal to a main axis of the polarizer to obtain a third linearly polarized optical signal, and
input the third linearly polarized optical signal to the third photoelectric detector;
wherein the apparatus further comprises a third photoelectric detector; and
wherein apparatus further comprises a third analog-to-digital converter,
wherein the third photoelectric detector is configured to:
convert the third linearly polarized optical signal into a third analog signal, and
input the third analog signal to the third analog-to-digital converter;
wherein the third analog-to-digital converter is configured to:
perform analog-to-digital conversion on the third analog signal to obtain a third digital signal, and
input the third digital signal to the digital signal processor; and
wherein the digital signal processor is further configured to process the third digital signal to obtain the baseband signal.

3. The apparatus according to claim 2, wherein at least one of a first polarization controller or a first optical fiber is disposed between the optical splitter and the polarization beam splitter, and wherein the first polarization controller or the first optical fiber is configured to adjust a polarization state of the second polarization multiplexing optical signal; and/or
wherein at least one of a second polarization controller or a second optical fiber is disposed between the optical splitter and the polarizer, and wherein the second polarization controller or the second optical fiber is configured to adjust a polarization state of the second polarization multiplexing optical signal.

4. The apparatus according to claim 1, wherein the optical signal processor further comprises a second polarization beam splitter configured to:
couple and output a third polarization multiplexing optical signal to two main axes of the second polarization beam splitter to obtain a third linearly polarized optical signal and a fourth linearly polarized optical signal,
input the third linearly polarized optical signal to the third photoelectric detector, and
input the fourth linearly polarized optical signal to the fourth photoelectric detector;
wherein the apparatus further comprises a a third photoelectric detector and a fourth photoelectric detector,
wherein the apparatus further comprises a third analog-to-digital converter and a fourth analog-to-digital converter,
wherein the third photoelectric detector is configured to:
convert the third linearly polarized optical signal into a third analog signal, and
input the third analog signal to the third analog-to-digital converter;
wherein the fourth photoelectric detector is configured to:
convert the fourth linearly polarized optical signal into a fourth analog signal, and
input the fourth analog signal to the fourth analog-to-digital converter;
wherein the first analog to digital converter is configured to:
perform analog to digital conversion on the first analog signal to obtain a first digital signal, and
input the first digital signal to the digital signal processor;
wherein the third analog-to-digital converter is configured to:
perform analog-to-digital conversion on the third analog signal to obtain a third digital signal, and
input the third digital signal to the digital signal processor;
wherein the fourth analog-to-digital converter is configured to:
perform analog-to-digital conversion on the fourth analog signal to obtain a fourth digital signal, and
input the fourth digital signal to the digital signal processor; and
wherein the digital signal processor is further configured to process the third digital signal and the fourth digital signal to obtain the baseband signal.

5. The apparatus according to claim 4, wherein at least one of a first polarization controller or a first optical fiber is disposed between the optical splitter and the first polarization beam splitter, and wherein the first polarization controller or the first optical fiber is configured to adjust a polarization state of the second polarization multiplexing optical signal; and/or
wherein at least one of a second polarization controller or a second optical fiber is disposed between the optical splitter and the second polarization beam splitter, and the second polarization controller or the second optical fiber is configured to adjust a polarization state of the second polarization multiplexing optical signal.

6. The apparatus according to claim 1, further comprising:
an antenna;
a bandpass filter;
a low noise amplifier;
a photoelectric modulator;
a local oscillator;
a laser; and
an optical bandpass filter,
wherein the antenna is configured to:
receive a first radio frequency signal, and
input the first radio frequency signal to the bandpass filter;
wherein the bandpass filter is configured to:
filter the first radio frequency signal to obtain a second radio frequency signal, and
input the second radio frequency signal to the low noise amplifier;
wherein the low noise amplifier is configured to:
perform signal amplification on the second radio frequency signal to obtain a third radio frequency signal, and
input the third radio frequency signal to a radio frequency input end of the photoelectric modulator;
wherein the local oscillator is configured to:
generate a local oscillator signal having a same frequency as the third radio frequency signal, and input the local oscillator signal to another radio frequency input end of the photoelectric modulator;
wherein the laser is configured to:
generate a fifth linearly polarized optical signal, and input the fifth linearly polarized optical signal to an optical input end of the photoelectric modulator;
wherein the photoelectric modulator is configured to:
split the fifth linearly polarized optical signal into an upper path and a lower path, separately perform optical domain modulation on the third radio frequency signal and the local oscillator signal by using the fifth linearly polarized optical signal,
obtain orthogonal polarization multiplexing light, and input the orthogonal polarization multiplexing light to the optical bandpass filter; and
wherein the optical bandpass filter is configured to:
filter the orthogonal polarization multiplexing light to obtain an upper sideband signal or a lower sideband signal of the orthogonal polarization multiplexing light, and
determine the upper sideband signal or the lower sideband signal as the first polarization multiplexing optical signal.

7. A signal receiving method, comprising:
receiving a first polarization multiplexing optical signal from a remote apparatus, wherein the first polarization multiplexing optical signal is obtained by modulating a radio frequency signal and a local oscillator signal to two orthogonal polarization states of an optical carrier;
splitting the first polarization multiplexing optical signal into at least two paths to obtain at least a second polarization multiplexing optical signal;
inputting the second polarization multiplexing optical signal into an optical signal processor;
coupling the second polarization multiplexing optical signal into two main axes of a polarization beam splitter and outputting, by the polarization beam splitter, a first linearly polarized optical signal and a second linearly polarized optical signal;
inputting the first linearly polarized optical signal to a first photoelectric detector;
inputting the second linearly polarized optical signal to a second photoelectric detector;
converting, by the first photoelectric detector, the first linearly polarized optical signal into a first analog signal;
converting, by the second photoelectric detector, the second linearly polarized optical signal into a second analog signal;
performing, by a first analog-to-digital converter, analog-to-digital conversion on the first analog signal to obtain a first digital signal;
performing, by a second analog-to-digital converter, analog-to-digital conversion on the second analog signal to obtain a second digital signal; and
processing, by a digital signal processor, the first digital signal and the second digital signal to obtain a baseband signal.

8. The method according to claim 7, wherein the splitting the first polarization multiplexing optical signal into at least two paths obtains a third polarization multiplexing optical signal, the method further comprising:
obtaining, from the third polarization multiplexing optical signal, a third linearly polarized optical signal;
converting, by a third photoelectric detector, the third linearly polarized optical signal into a third analog signal; and
performing, by a third analog-to-digital converter, analog-to-digital conversion on the third analog signal to obtain a third digital signal,
wherein the processing the digital signal to obtain the baseband signal comprises processing the first digital signal, the second digital signal, and the third digital signal to obtain the baseband signal.

9. The method according to claim 8, wherein the coupling the second polarization multiplexing optical signal into two main axes of a polarization beam splitter and outputting, by the polarization beam splitter, a first linearly polarized optical signal and a second linearly polarized optical signal comprises:
adjusting a polarization state of the second polarization multiplexing optical signal to obtain an adjusted optical signal; and
coupling and outputting the adjusted optical signal to obtain the first linearly polarized optical signal and the second linearly polarized optical signal.

10. The method according to claim 8, wherein the obtaining, from the third polarization multiplexing optical signal, a third linearly polarized optical signal comprises:
adjusting a polarization state of the third polarization multiplexing optical signal to obtain another adjusted optical signal; and
coupling and outputting the another adjusted optical signal to obtain the third linearly polarized optical signal.

11. The method according to claim 7, wherein the splitting the first polarization multiplexing optical signal into at least two paths obtains a third polarization multiplexing optical signal, the method further comprising:
obtaining, from the third polarization multiplexing optical signal, a third linearly polarized optical signal and a fourth linearly polarized optical signal;
converting, by a third photoelectric detector, the third linearly polarized optical signal into a third analog signal;
converting, by a fourth photoelectric detector, the fourth linearly polarized optical signal into a fourth analog signal;
performing analog-to-digital conversion on the third analog signal to obtain a third digital signal; and
performing analog-to-digital conversion on the fourth analog signal to obtain a fourth digital signal,
wherein the processing the digital signal to obtain the baseband signal comprises processing the first digital signal, the second digital signal, the third digital signal, and the fourth digital signal to obtain the baseband signal.

12. The method according to claim 11, wherein the coupling the second polarization multiplexing optical signal into two main axes of a polarization beam splitter and outputting, by the polarization beam splitter, a first linearly polarized optical signal and a second linearly polarized optical signal comprises:
adjusting a polarization state of the second polarization multiplexing optical signal to obtain an adjusted optical signal; and
coupling and outputting the adjusted optical signal to obtain the first linearly polarized optical signal and the second linearly polarized optical signal.

13. The method according to claim 11, wherein the obtaining, from the third polarization multiplexing optical signal, a third linearly polarized optical signal and a fourth linearly polarized optical signal comprises:

adjusting a polarization state of the third polarization multiplexing optical signal to obtain another adjusted optical signal; and coupling and outputting the another adjusted optical signal to obtain the third linearly polarized optical signal and the fourth linearly polarized optical signal.

14. A signal receiving system, comprising:
the signal receiving apparatus according to claim 1;
a remote apparatus; and
an optical fiber.

15. A signal receiving apparatus configured to implement the method according to claim 7.

* * * * *